(12) United States Patent
Simske

(10) Patent No.: US 9,384,356 B2
(45) Date of Patent: Jul. 5, 2016

(54) OBSCURING INTERNET TENDENCIES

(75) Inventor: Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/391,216

(22) PCT Filed: Jun. 29, 2012

(86) PCT No.: PCT/US2012/045106
§ 371 (c)(1),
(2), (4) Date: Oct. 8, 2014

(87) PCT Pub. No.: WO2014/003794
PCT Pub. Date: Jan. 3, 2014

(65) Prior Publication Data
US 2015/0106951 A1     Apr. 16, 2015

(51) Int. Cl.
| | | |
|---|---|---|
| G06F 21/00 | (2013.01) | |
| G06F 21/60 | (2013.01) | |
| H04W 12/02 | (2009.01) | |
| G06Q 30/02 | (2012.01) | |
| H04L 29/08 | (2006.01) | |

(52) U.S. Cl.
CPC ........... *G06F 21/60* (2013.01); *G06Q 30/0201* (2013.01); *H04L 67/02* (2013.01); *H04W 12/02* (2013.01); *H04L 67/22* (2013.01)

(58) Field of Classification Search
CPC ......... H04L 63/02; H04L 63/04; H04L 63/14; H04L 67/22; H04L 67/30; G06F 17/308
USPC ............. 726/1, 11–14, 22–25; 709/217–229; 713/150–154, 164–167, 189–194
See application file for complete search history.

(56) References Cited

U.S. PATENT DOCUMENTS

| | | | |
|---|---|---|---|
| 7,277,961 B1 * | 10/2007 | Smith | G06Q 20/20 705/25 |
| 8,205,258 B1 | 6/2012 | Chang et al. | |
| 2005/0188220 A1 | 8/2005 | Nilsson et al. | |
| 2009/0282034 A1 | 11/2009 | Goronzy et al. | |
| 2009/0300512 A1 | 12/2009 | Ahn | |
| 2010/0094612 A1 * | 4/2010 | Weerasinghe | H04L 12/5885 703/23 |
| 2010/0241507 A1 | 9/2010 | Quinn et al. | |
| 2010/0332431 A1 | 12/2010 | Ribiere et al. | |

(Continued)

FOREIGN PATENT DOCUMENTS

KR    10-2004-0083797 A    10/2004

OTHER PUBLICATIONS

Broder, Alan J. "Data Mining the Internet and Privacy." Web Usage Analysis and User Profiling. Springer Berlin Heidelberg, 2000. 56-73.*

(Continued)

*Primary Examiner* — Madhuri Herzog
(74) *Attorney, Agent, or Firm* — HP Inc. Patent Department

(57) ABSTRACT

Disclosed herein are techniques for obscuring Internet tendencies. It is determined whether a user tends to access a category of information over the Internet more than an average user. If the user accesses the category of information over the Internet more than the average user, a user profile associated with the user is adjusted such that the user profile is proportional to an average user profile associated with the average user.

15 Claims, 5 Drawing Sheets

(56) References Cited

U.S. PATENT DOCUMENTS

2011/0083013 A1 4/2011 Nice et al.
2012/0284299 A1* 11/2012 Ishikawa ............. G06F 21/6263
       707/769
2013/0254364 A1* 9/2013 Moganti ................. H04L 63/20
       709/223

OTHER PUBLICATIONS

Eltoweissy, Mohamed Y., Abdelmounaam Rezgui, and Athman Bouguettaya. "Privacy on the Web: Facts, challenges, and solutions." IEEE Security & Privacy 1.6 (2003): 0040-49.*

Howe, Daniel C., and Helen Nissenbaum. "TrackMeNot: Resisting surveillance in web search." Lessons from the Identity Trail: Anonymity, Privacy, and Identity in a Networked Society 23 (2009): 417-436.*

Soghoian, Christopher. "Problem of Anonymous Vanity Searches, The." ISJLP 3 (2007): 299.*

Balsa, E et al, "OB-PWS: Obfuscation-Based Private Web Search", 2012.

Peddinti, S. T. et al, "On the Effectiveness of Anonymizing Networks for Web Search Privacy", Mar. 22-24, 2011.

Peddinti, S.T. et al, "On the Privacy of Web Search Based on Query Obfuscation; A Case Study TrackMeNot", 2010.

* cited by examiner

```
//   get URL.java
Import java.io.*;// we use java.io package
Import java.net.*;// we use java.net package public class getURL {
  public void main (String []orgs) {
    URL url; // URL ia a java class in java.net package
    DataInputStream di_stream; // Used to stream buffered input to
    InputStream i_stream; // Data from the URL enters this Stream
    String s;
    Try (
      url = new URL("args[0]");
      i_stream = url.openStream();
      di_stream = new DataInputStream( new BufferedInputStream(i_stream));
        // required in Java for alacrity of stream reading
      while( ( s=di_stream.readLine() ) != null )
        // Handle stream here -- save or analyze as needed
      } catch (MalformedURLException MURLe ) {
        // Notify user of Malformed URL
        System.exit(1);
      } catch (IOException Ioe ) {
        // Notify user of IO exception
        System.exit(2);
      } finally{
        // Close the InputStream and catch any exceptions
      }
    } // End of main() method
  } // End of class definition
```

*Fig. 4*

OBSCURING INTERNET TENDENCIES

BACKGROUND

The advent of electronic commerce has given rise to online marketers who collect information about users and their tendencies on the Internet. Web browsers may be equipped with software that observes aggregate user behavior across a large number of websites. By way of example, tracking information stored in the browser may indicate that a user often browses a sports website right after browsing a news website. Such information may be used to provide specifically targeted advertisements to users while they interact online. These analytics may also be used to determine information about the number of page views over time.

BRIEF DESCRIPTION OF THE DRAWINGS

FIG. 4 is example source code for adjusting a user profile.

DETAILED DESCRIPTION

As noted above, the Internet tendencies of users may be accessed by online marketers to determine the type of advertisements to display as they interact online. However, as the user community becomes more aware of these marketing strategies, they have become highly critical of them for invading their privacy. Recently, more systems have been moving toward cloud computing. This recent trend may provide even greater access to browsing history data than before.

In view of the foregoing, disclosed herein are a system, non-transitory computer readable medium, and method to obscure the Internet tendencies of a user. In one example, it is determined whether a user tends to access a category of information over the Internet more than an average user. If the user accesses the category of information over the Internet more than the average user, a user profile associated with the user may be adjusted such that the user profile is proportional to an average user profile. The techniques disclosed herein may disguise a user's Internet tendencies by adjusting the user's profile to be proportional to the average user of a system. When the user's profile is analyzed by online marketers, the actual Internet tendencies of the user will be undeterminable. As such, the user's online privacy is protected. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
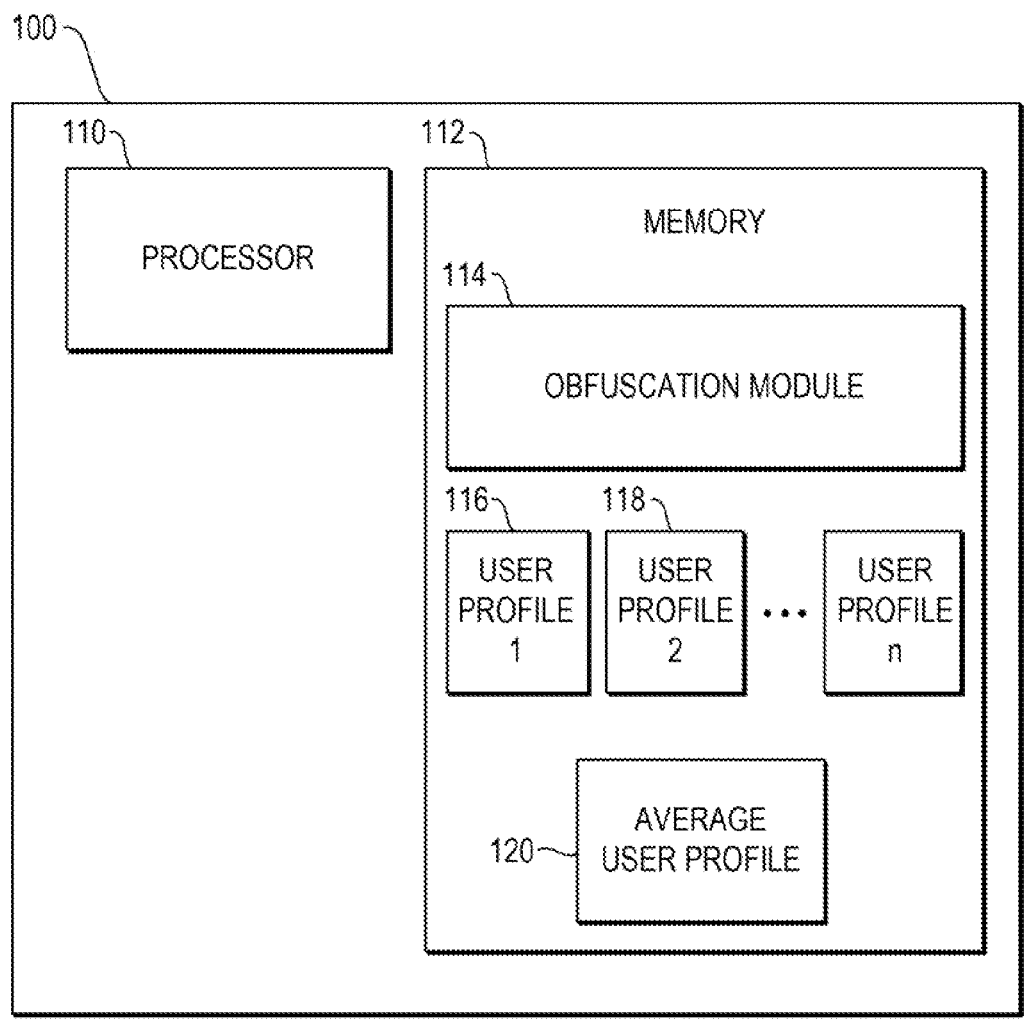
FIG. 1 is a block diagram of an example system that may be used to obscure the Internet tendencies of users.

FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network using conventional protocols (e.g., Ethernet, Wi-Fi, Bluetooth, etc.).

The computer apparatus 100 may also contain a processor 110 and memory 112. Memory 112 may store instructions that may be retrieved and executed by processor 110. In one example, memory 112 may be a random access memory ("RAM") device. In a further example, memory 112 may be divided into multiple memory segments organized as dual in-line memory modules ("DIMMs"). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Furthermore, computer apparatus 100 may actually comprise multiple processors and memories working in tandem.

The instructions residing in memory 112 may comprise any set of instructions to be executed directly (such as machine code) or indirectly (such as scripts) by processor 110. In that regard, the terms "instructions," "scripts," "applications," "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Obfuscation module 114 may implement the Internet privacy techniques disclosed herein and may be realized in any non-transitory computer-readable media. Thus, in one example, memory 112 may be a non-transitory computer-readable media for use by or in connection with an instruction execution system such as computer apparatus 100, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Processor 110 may also retrieve, store, or modify at least one user profile, such as user profiles 116 and 118. In one example, computer apparatus 100 may be used by an individual such that the user profile associated therewith includes browser cookies. In this instance average user profile 120 may reside in computer apparatus 100 and may account for other users with the same profile. If the user is an individual in a corporation, corporate sniffers may detect and maintain the average user profile for each individual user. In another example, computer apparatus 100 may be a proxy server or a cloud server containing a plurality of user profiles for each user in the system. Thus, if there are n users there may be n user profiles. In this instance, average user profile 120 may contain information associated with an average user of the system. The user profiles may be stored in any format not limited by any data structure or product. The user profiles may be stored in computer registers, in a relational database with tables having a plurality of different fields and records. XML documents or flat files. Furthermore, the user profiles may comprise any information sufficient to identify the relevant information, such as numbers, descriptive text, proprietary codes, references to data stored in other areas of the same memory or different memories (including other network locations) or information that is used by a function to calculate the relevant data.

Figure 2:
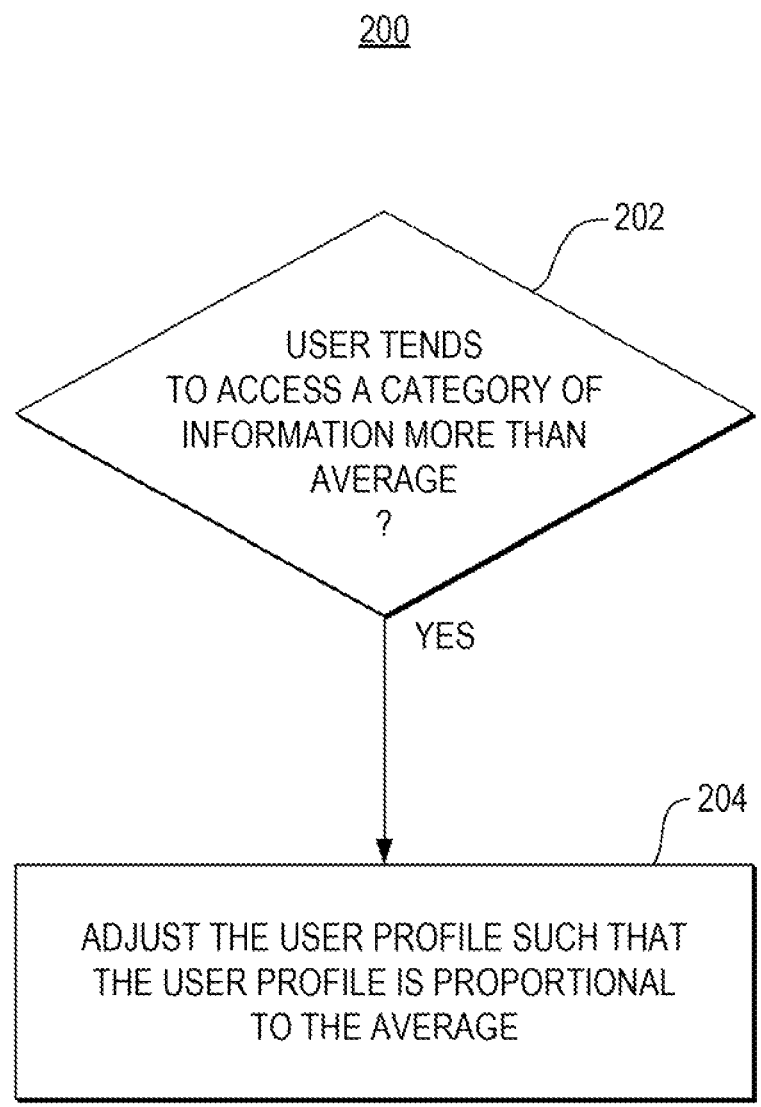
FIG. 2 is a flow diagram of an example method to obscure Internet tendencies in accordance with aspects of the present disclosure.
Figure 3:
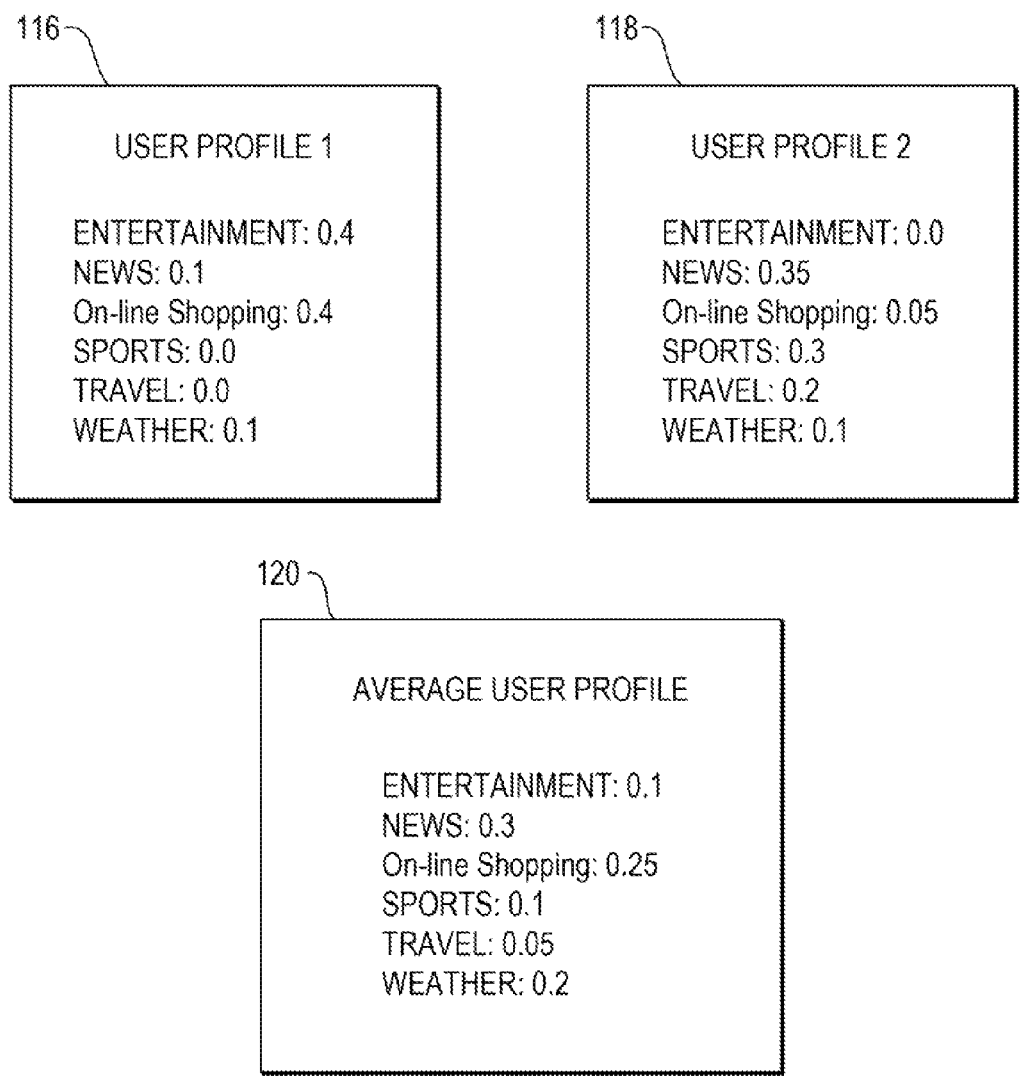
FIG. 3 is a working example in accordance with the techniques disclosed herein.
Figure 5:
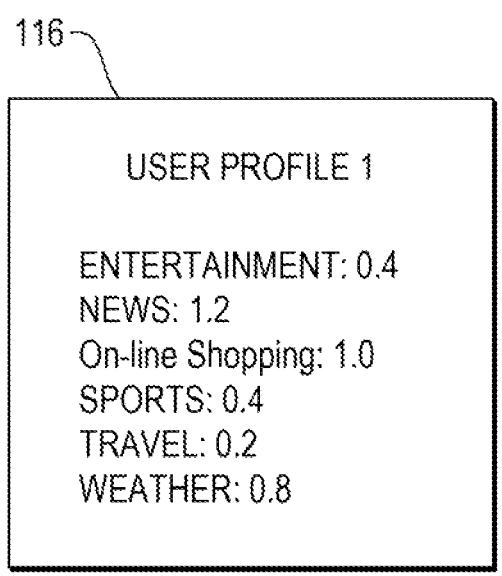
FIG. 5 is a further working example in accordance with aspects of the present disclosure.

Although all the components of computer apparatus 100 are functionally illustrated in FIG. 1 as being within the same block, it will be understood that the components may or may not be stored within the same physical housing. Furthermore, computer apparatus 100 may be a node of a network. For example, if computer apparatus 100 is a proxy server, such a network may be a local area network ("LAN"), wide area network ("WAN"), and/or the Internet, etc. Computer apparatus 100 and any intervening nodes of the network may also use various protocols including virtual private networks, local Ethernet networks, private networks using communication protocols proprietary to one or more companies, cellular and wireless networks, instant messaging, HTTP and SMTP, and various combinations of the foregoing. Thus, it should be understood that the techniques disclosed herein may be utilized for privacy protection of Internet traffic flowing through any monitored conduit (e.g., house line, T100 line, wireless router etc.). Computer apparatus 100 may also comprise a plurality of computers, such as a load balancing network, that exchange information with different nodes of a network for the purpose of receiving, processing, and transmitting data to multiple remote computers. In this instance, computer apparatus 100 may typically still be at different nodes of the network One working example of the system, method, and non-transitory computer-readable medium is shown in FIGS. 2-5. In particular, FIG. 2 illustrates a flow diagram of an example method for obscuring Internet tendencies in accordance with aspects of the present disclosure. FIGS. 3-5 show a working example of Internet tendency obfuscation in accordance with the techniques disclosed herein. The actions shown in FIGS. 3-5 will be discussed below with regard to the flow diagram of FIG. 2.

Referring to FIG. 2, it may be determined whether a user tends to access a category of information over the Internet more than average, as shown in block 202. FIG. 3 shows a close up illustration of user profile 116, user profile 118, and the average user profile 120. Each user profile may comprise a plurality of values, each value may represent a tendency of a user to access a category of information over the Internet. In one example, each value in a user profile may be a ratio of time spent accessing a category of information over the Internet to the total time spent on the Internet. In another example, each value in a user profile may be a ratio of an amount of data associated with a category downloaded from the Internet to the total amount of data downloaded from the Internet. For ease of illustration, the only categories shown in FIG. 3 are entertainment, news, online shopping, sports, travel, and weather. The example user profile 116 shows that the user associated therewith spends 40 percent of his/her total Internet time on entertainment, 10 percent on news, another 40 percent on online shopping, and 10 percent on weather. The user associated with user profile 116 does not spend anytime accessing sports or travel. The values in user profile 116 add up to 100 percent. The example user profile 118 shows that the user associated therewith spends 35 percent of his/her total Internet time on news, 5 percent on online shopping, 30 percent on sports, 20 percent on travel, and 10 percent on weather. The user associated with user profile 118 does not spend anytime accessing entertainment. As with user profile 116, the values of user profile 118 also add up to 100 percent. The example average user profile 120 shows that on average the users of the system spend 10 percent of their total Internet time on entertainment, 30 percent on news, 25 percent on online shopping, 10 percent on sports, 5 percent on travel, and 20 percent on weather. The values in the average user profile 120 also add up to 100 percent.

Referring back to FIG. 2, if it is determined that a user tends to access a category of information over the Internet more than the average, each value in the user profile may be adjusted such that each value therein is proportional to the average tendency for the category of information corresponding thereto, as show in block 204. Referring back to FIG. 3, user profile 116 shows that the user associated therewith accesses entertainment and online shopping more than the average user. In one example, to adjust each value in the user profile associated with the user, an adjustment for each value in the user profile may be determined. Each value in the user profile may be adjusted in accordance with the determined adjustment. In one example, to determine the adjustment, a plurality of ratios may be generated. Each ratio may be equal to each value in the user profile divided by the average tendency for the category of information corresponding to each value. In the example of FIG. 3, the ratios for user profile 116 may be the following:

Entertainment: $0.4/0.1=4.0$
News: $0.1/0.3=0.333$
Online Shopping: $0.4/0.25=1.6$
Sports: $0.0/0.1=0.0$
Travel: $0.0/0.05=0.0$
Weather: $0.1/0.2=0.5$ The example above shows each value associated with each category in user profile 116 divided by the average tendency corresponding thereto. Once the ratios are calculated the highest ratio of the plurality of ratios may be determined. The highest ratio in the example above is 4.0. A plurality of products may be generated such that each product may be equal to the average tendency corresponding to each value in the user profile multiplied by the highest ratio. Furthermore, a plurality of obfuscation values may be generated. Each obfuscation value may be equal to each aforementioned product minus each value in the user profile corresponding to each product. Applying the foregoing example calculations to the values above result in the following:

Entertainment: $4.0\times(0.1)-0.4=0.0$
News: $4.0\times(0.3)-0.1=1.1$
Online Shopping: $4.0\times(0.25)-0.4=0.6$
Sports: $4.0\times(0.1)-0.0=0.4$
Travel: $4.0\times(0.05)-0.0=0.2$
Weather: $4.0\times(0.2)-0.1=0.7$ Each example obfuscation value generated above may be added to each corresponding value in the user profile. In one example, this adjustment may be carried out by executing computer readable instructions that causes a processor to download information from websites associated with each category. FIG. 4 shows example source code written in the Java™ programming language that may be used to download information from websites of different categories to add a corresponding obfuscation value to each value in the user profile. Adding each example obfuscation value calculated above to a corresponding value in user profile 116 results in the following:

Entertainment: 0.4+0.0=0.4
News: 0.1+1.1=1.2
Online Shopping: 0.4+0.6=1
Sports: 0.0+0.4=0.4
Travel: 0.0+0.2=0.2
Weather: 0.1+0.7=0.8

FIG. 5 shows an adjusted user profile 116 after adding the obfuscation values to each of the user profile values as demonstrated above. As shown in FIG. 5, the values in the example user profile 116 now add up to 4 (i.e., 4 percent). Each value in user profile 116 is proportional to its counterpart in average user profile 120. For example, the value 0.4 associated with entertainment divided by 4 equals 0.1, which is the average for entertainment depicted in average user profile 120. Thus, online marketers analyzing the adjusted user profile may not be able to detect the categories that deviate from the average. Advantageously, the foregoing computer apparatus, non-transitory computer readable medium, and method maintain the privacy of Internet users. In this regard, users may be rest assured that their Internet behavior is hidden from third party advertisers.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently and steps may be added or omitted.

The invention claimed is:

1. A computing system comprising:
a hardware processor;
a memory on which is stored machine readable instructions that are to cause the hardware processor to:
determine whether a value of a plurality of values corresponding to a user profile indicates that the user tends to access a category of information over the Internet more than an average tendency for the category of information, wherein the average tendency represents an average tendency of a plurality of users to access the category of information over the internet;
in response to a determination that the value indicates that the user tends to access the category of information over the Internet more than the average tendency by the plurality of users, adjust the value in the user profile associated with the user such that the value is proportional to the average tendency for the category of information corresponding thereto; and
output the adjusted value in the user profile in order to obscure the tendency of the user.

2. The computing system of claim 1, wherein the value representing the tendency of the user to access the category of information over the Internet is a ratio of time spent accessing the category of information over the Internet to total time spent by the user on the Internet.

3. The computing system of claim 1, wherein to adjust the value in the user profile associated with the user, the machine readable instructions are further to cause the hardware processor to:
determine an adjustment for the value in the user profile associated with the user; and
adjust the value in the user profile associated with the user in accordance with the determined adjustment.

4. The computing system of claim 3, wherein to determine the adjustment, the machine readable instructions are further to cause the hardware processor to:
generate a plurality of ratios, each ratio being equal to each value of the plurality of values in the user profile divided by the average tendency for the category of information corresponding thereto;
determine a highest ratio of the generated plurality of ratios; and
generate a plurality of products, each product being equal to the average tendency for the category of information corresponding to each value in the user profile multiplied by the highest ratio; and
generate a plurality of obfuscation values, each obfuscation value being equal to each product minus each value in the user profile corresponding to each product.

5. The computing system of claim 4, wherein to adjust each value in the user profile, the machine readable instructions are further to cause the hardware processor to add each value in the user profile to an obfuscation value of the plurality of obfuscation values corresponding thereto.

6. A non-transitory computer readable medium having instructions stored therein which, when executed by a hardware processor, cause the hardware processor to:
determine whether a user accesses a category of information over an Internet more than an average user;
in response to a determination that the user accesses the category of information over the Internet more than the average user, adjust a user profile associated with the user such that the user profile indicates that a tendency of the user to access the category of information is proportional to an average tendency of a plurality of users to access the access of information; and
output the adjusted user profile associated with the average user to obfuscate the tendency of the user to access the category of information.

7. The non-transitory computer readable medium of claim 6, wherein the user profile comprises a plurality of values, each value representing a tendency of a user to access a category of information over the Internet.

8. The non-transitory computer readable medium of claim 7, wherein the plurality of users are associated with user profiles comprising a plurality of averages, each average of the plurality of averages representing an average tendency of the plurality of users to access the category of information over the Internet.

9. The non-transitory computer readable medium of claim 8, wherein to adjust the user profile, the instructions stored therein are further to cause the hardware processor to:
generate a plurality of ratios, each ratio being equal to each value of a plurality of values in the user profile divided by the average tendency for the category of information corresponding thereto;
determine a highest ratio of the generated plurality of ratios; and
generate a plurality of products, each product being equal to the average tendency for the category of information corresponding to each value in the user profile multiplied by the highest ratio; and generate a plurality of obfuscation values, each obfuscation value being equal to each product minus each value in the user profile corresponding to each product.

10. The non-transitory computer readable medium of claim 9, wherein the instructions stored therein are further to cause the hardware processor to add each value in the user profile to an obfuscation value of the plurality of obfuscation values corresponding thereto.

11. A method comprising:
   determining, using a hardware processor, whether a value in a user profile indicates that a user associated therewith tends to access a category of information over an Internet more than an average user, the average user being associated with an average user profile; and
   in response to the value in the user profile indicating that the user associated therewith accesses the category of information over the Internet more than the average user, adjusting, using the processor, each value in the user profile such that each value in the user profile is proportional to each corresponding value in the average user profile, each value in the user profile being associated with a category of information accessed by the user over the Internet; and
   outputting the adjusted user profile to obfuscate the tendency of the user to access the category of information.

12. The method of claim 11, wherein each value associated with the category of information accessed by the user over the Internet is a ratio of time spent accessing the category of information over the Internet to total time spent by the user on the Internet.

13. The method of claim 11, wherein adjusting each value in the user profile associated with the user comprises:
   determining, using the hardware processor, an adjustment for each value in the user profile associated with the user; and
   adjusting, using the hardware processor, each value in the user profile associated with the user in accordance with the determined adjustment.

14. The method of claim 13, wherein determining the adjustment comprises:
   generating, using the processor, a plurality of ratios, each ratio being equal to each value in the user profile divided by an average tendency for the category of information corresponding thereto;
   generating, using the processor, a plurality of products, each product being equal to the average tendency for the category of information corresponding to each value in the user profile multiplied by a highest ratio of the plurality of ratios;
   and
   generating, using the processor, a plurality of obfuscation values, each obfuscation value being equal to each product minus each value in the user profile corresponding to each product.

15. The method of claim 14, further comprising adjusting each value in the user profile by adding each value in the user profile to an obfuscation value of the plurality of obfuscation values corresponding thereto.

* * * * *